United States Patent [19]

Tsuboi et al.

[11] Patent Number: 5,792,279
[45] Date of Patent: Aug. 11, 1998

[54] EQUIPMENT ADAPTED TO USE SOLAR CELL OR DEVICE ADAPTED TO THE EQUIPMENT

[75] Inventors: Takayuki Tsuboi, Yokohama; Toshinori Sato, Hachioji; Hiroshi Kikuchi, Zushi, all of Japan

[73] Assignee: Canon Kabushiki Kaisha, Tokyo, Japan

[21] Appl. No.: 824,838

[22] Filed: Mar. 26, 1997

Related U.S. Application Data

[63] Continuation of Ser. No. 362,992, Dec. 23, 1994, abandoned.

[30] Foreign Application Priority Data

Dec. 28, 1993 [JP] Japan ................... 5-349126

[51] Int. Cl.⁶ ................................................. H01L 31/045
[52] U.S. Cl. ................... 136/245; 136/246; 136/251; 136/259; 136/291; 206/316.2; 379/440
[58] Field of Search .................. 136/245–246, 136/251, 259, 291; 429/9; 354/429, 477, 484; 379/440, 457; 206/316.2, 320, 470, 527

[56] References Cited

U.S. PATENT DOCUMENTS

| | | | |
|---|---|---|---|
| 4,421,943 | 12/1983 | Withjack | 136/246 |
| 5,089,764 | 2/1992 | Bobier | 320/20 |
| 5,129,753 | 7/1992 | Wesley et al. | 403/322 |
| 5,221,363 | 6/1993 | Gillard | 136/248 |
| 5,260,885 | 11/1993 | Ma | 364/708.1 |

FOREIGN PATENT DOCUMENTS

| | | |
|---|---|---|
| 0456950 | 11/1991 | European Pat. Off. . |
| 0629033A2 | 12/1993 | European Pat. Off. . |
| 0629033A2 | 12/1994 | European Pat. Off. . |
| 3727892 | 3/1989 | Germany . |
| 9208019 | 7/1993 | Germany . |
| 63-160056 | 7/1963 | Japan . |
| 63-091641 | 4/1988 | Japan . |
| 1-64372 | 3/1989 | Japan . |
| 2-724549 | 5/1990 | Japan . |
| 4-171774 | 6/1992 | Japan . |
| 4-296145 | 10/1992 | Japan . |

*Primary Examiner*—Nam Nguyen
*Attorney, Agent, or Firm*—Fitzpatrick, Cella, Harper & Scinto

[57] ABSTRACT

An equipment adapted to use a solar cell, or a device adapted to this equipment, includes a first unit for setting the equipment in a first state in which the equipment is in use, and in a second state in which the equipment is not in use, and a second unit for setting the equipment in a third state for heat insulation, which is different from the first and second states, under a condition in which the solar cell generates electricity.

176 Claims, 8 Drawing Sheets

1
EQUIPMENT ADAPTED TO USE SOLAR CELL OR DEVICE ADAPTED TO THE EQUIPMENT

This application is a continuation of application Ser. No. 08/362,992 filed Dec. 23, 1994, now abandoned.

BACKGROUND OF THE INVENTION

1. Field of the Invention

The present invention relates to an improvement in providing safety against heat of an equipment adapted to use a solar cell.

2. Related Background Art

A variety of applications pertaining to portable electronic equipment with a solar cell have been developed. In particular, Japanese Laid-Open Patent Application No. 63-166056 corresponding to U.S. Pat. No. 5,039,928 has proposed a heat-insulating or heat-dissipating structure of the main body of an equipment. In this structure, a secondary battery and a solar cell can be integrally detached from the equipment main body and charged with energy in the sunlight in this detached state. As a consequence, the equipment main body is protected from heat.

In this structure, however, the attaching/detaching mechanism is complicated, and the contact portion is contaminated to readily cause a conduction failure. In addition, if a user inadvertently places the integrated secondary battery and solar cell in the sunlight without detaching them from the equipment main body, the equipment main body fails due to a high temperature. That is, a structure of this sort has many problems.

A lithium ion battery commercially available from Sony Energy Tech K.K. in recent years has no memory effect and suffers little self-discharge compared to conventional nickel-cadmium batteries. That is, this lithium ion battery has characteristics suited for use with a solar cell. However, this lithium ion battery is adversely affected by high temperatures. Failure to overcome this drawback has been the obstacle to the technique of manufacturing an electronic equipment with a solar cell.

Taking account of the above problem, the present applicant has already proposed an equipment, in Japanese Patent Application No. 5-140686, in which an air layer is formed between a panel with a solar cell and the equipment main body incorporating a secondary battery, thereby cooling the equipment main body with natural convection. The present applicant has also devised an electronic equipment with a novel structure by which a secondary battery and some other parts incorporated in the equipment main body and susceptible to heat can be protected even under conditions in which the temperature of the solar cell unit rises.

SUMMARY OF THE INVENTION

One aspect of the present invention is to provide an equipment adapted to use a solar cell, or a device adapted to this equipment, comprising first means for setting the equipment in a first state in which the equipment is in use, and in a second state in which the equipment is not in use, and second means for setting the equipment in a third state for heat insulation, which is different from the first and second states, under a condition in which the solar cell generates electricity, or comprising a heat-insulating portion for automatically setting the equipment in a state of heat insulation in accordance with the temperature of the equipment, thereby appropriately preventing the adverse effect of heat on the equipment under the condition in which the solar cell generates electricity.

Other aspects of the invention will become apparent from the following detailed description taken in conjunction with the appended claims.

DETAILED DESCRIPTION OF THE PREFERRED EMBODIMENTS

Preferred embodiments of the present invention will be described in detail below with reference to the accompanying drawings.

FIGS. 1A to 5 are views showing an electronic equipment with a solar cell according to the first embodiment of the present invention. Although a camera is taken as an example of the equipment in this embodiment, the equipment can be any electronic equipment such as a portable telephone (to be described later), a radio, or a computer.

Figure 1A:
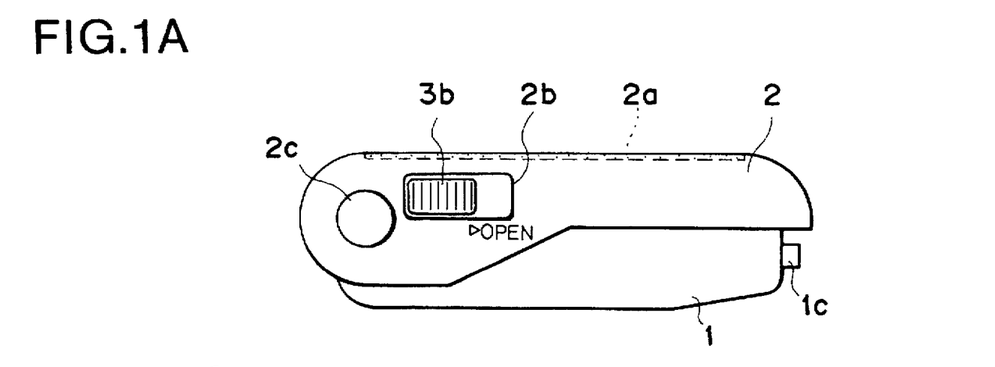
FIGS. 1A to 1C are side views of a camera according to the first embodiment of the present invention, in which the camera is viewed from the side of a surface away from a surface on which a release button is arranged.
Figure 1B:
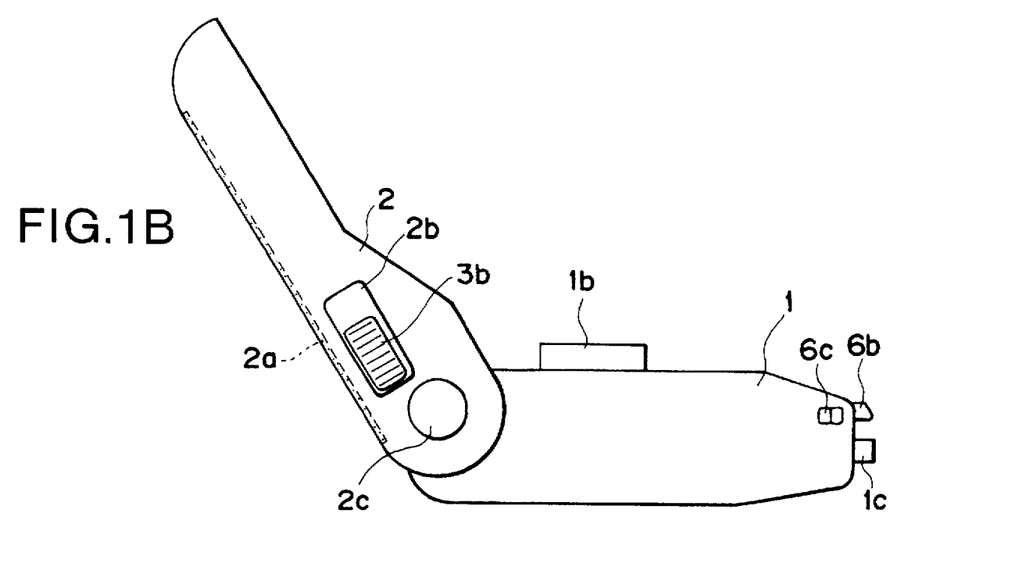
Figure 1C:
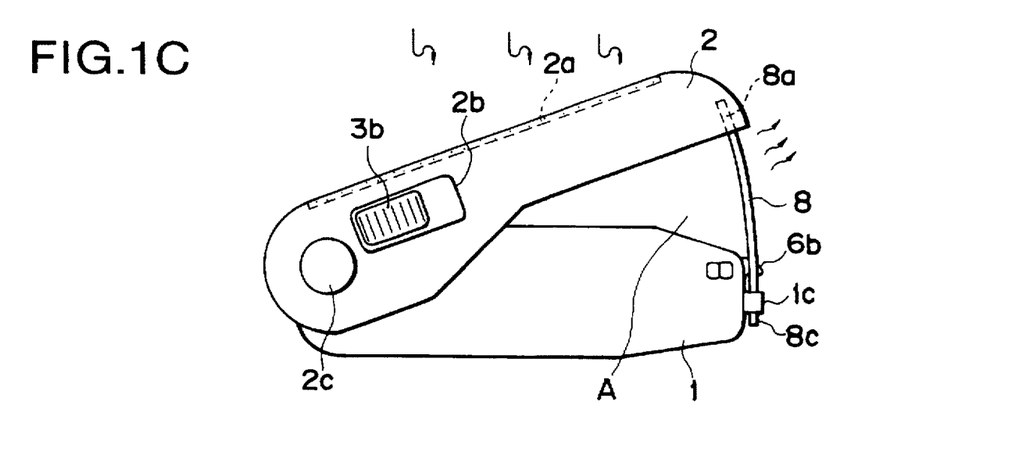
Figure 2:
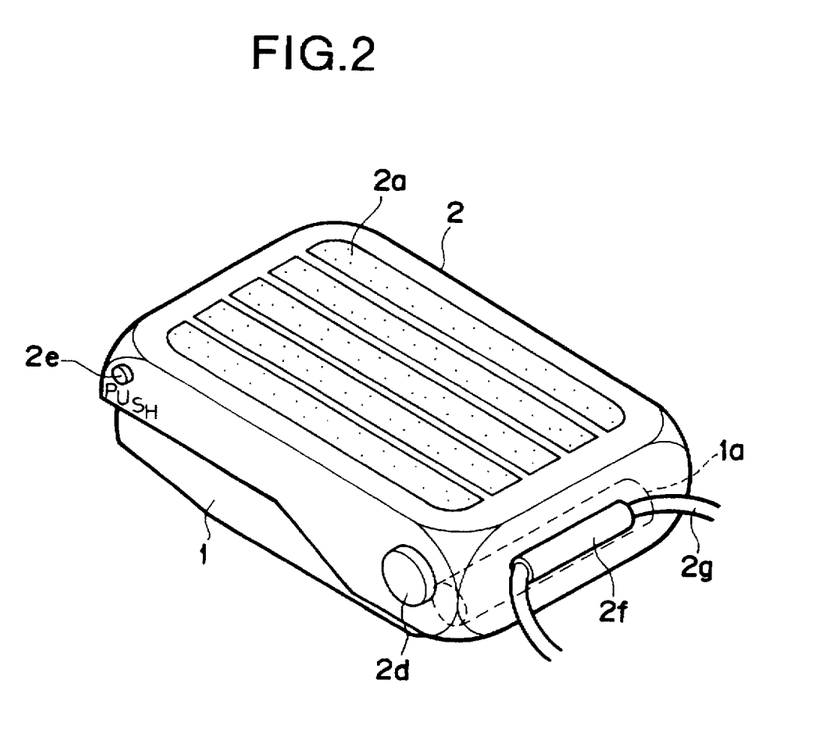
FIG. 2 is a perspective view of the camera shown in FIGS. 1A to 1C, in which the camera is viewed in a direction in which the surface with the release button is seen.
Figure 3:
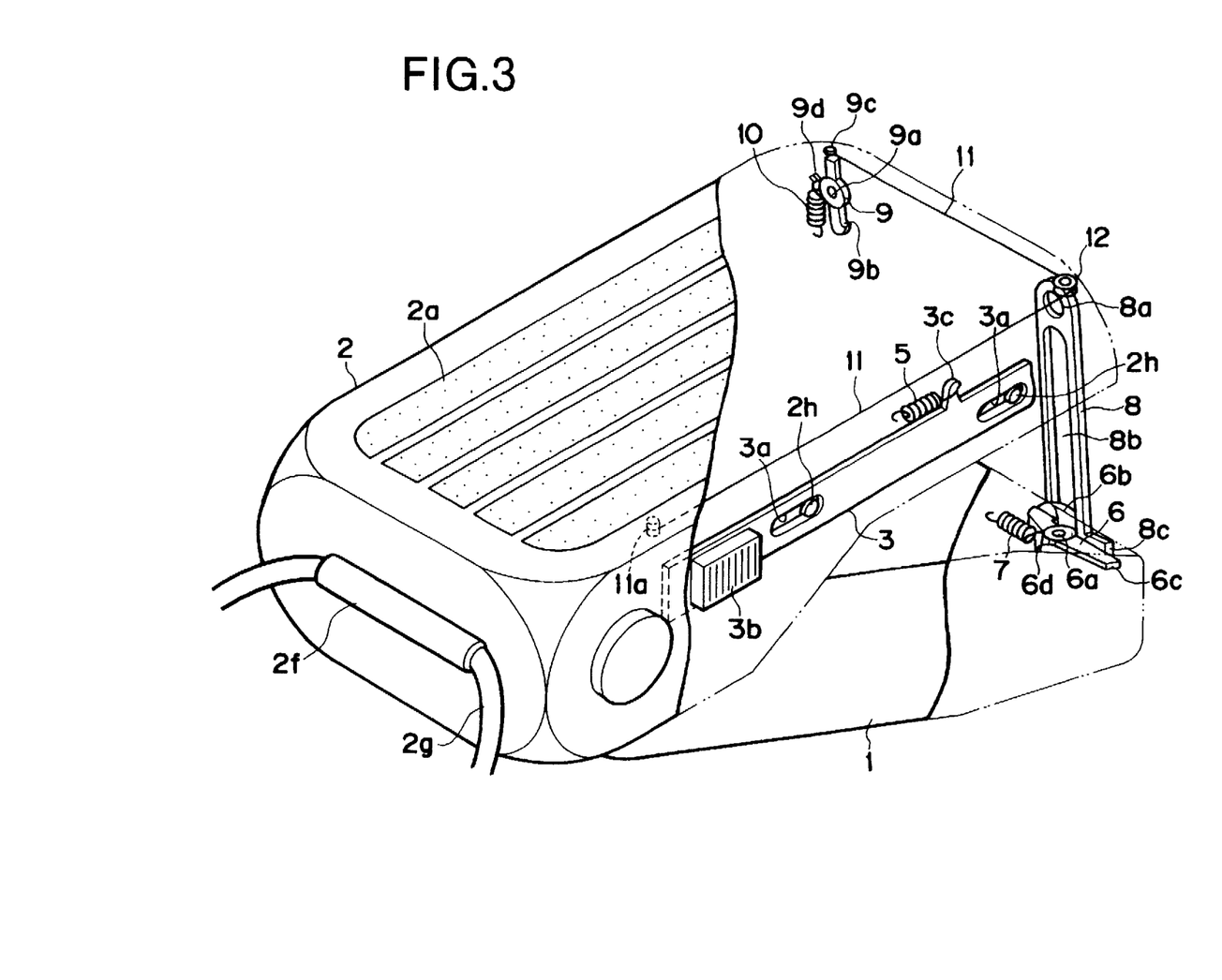
FIG. 3 is a partially cutaway perspective view showing a safety mechanism when the camera in FIGS. 1A to 1C is placed in a charging state.
Figure 4:
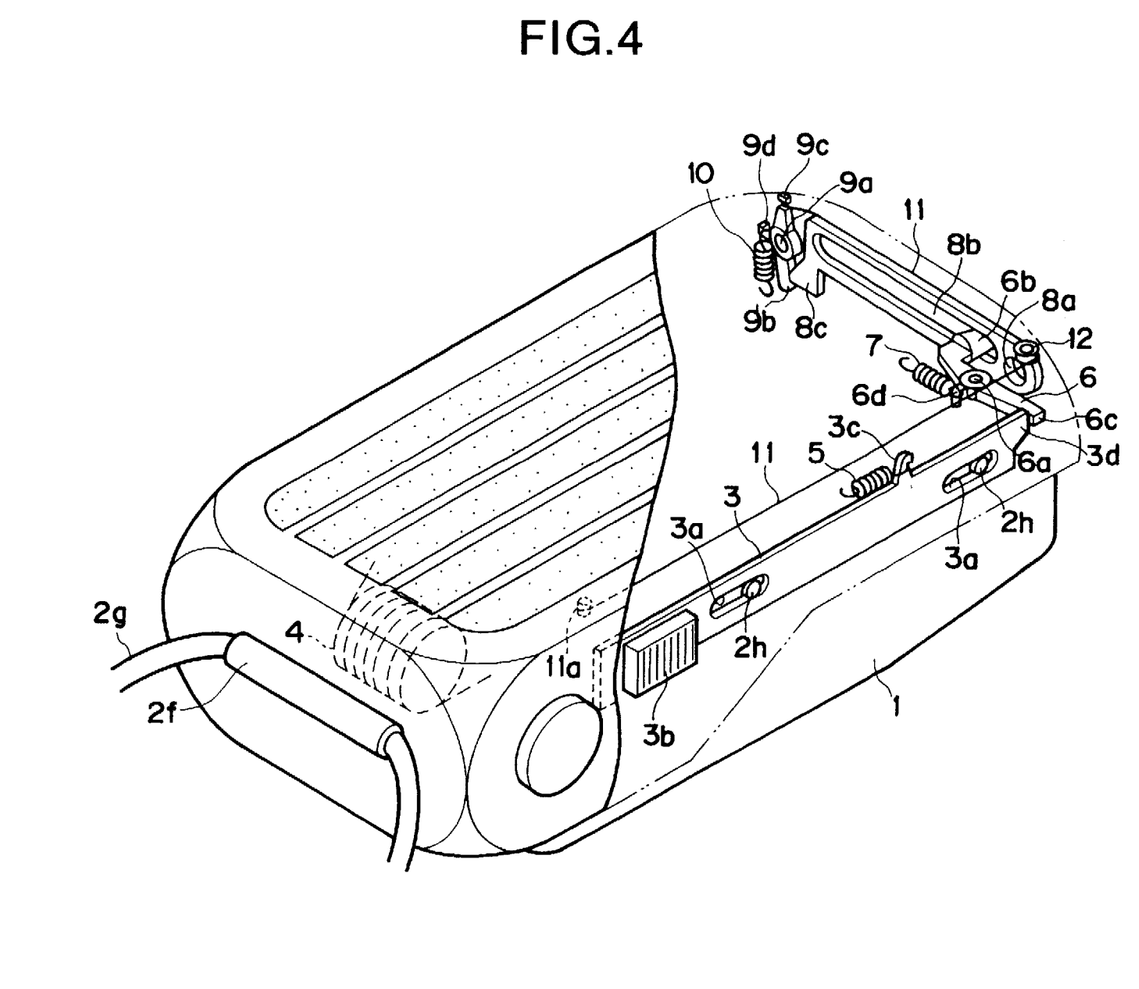
FIG. 4 is a partially cutaway perspective view showing the safety mechanism when the camera in FIGS. 1A to 1C is set in a portable state.
Figure 5:
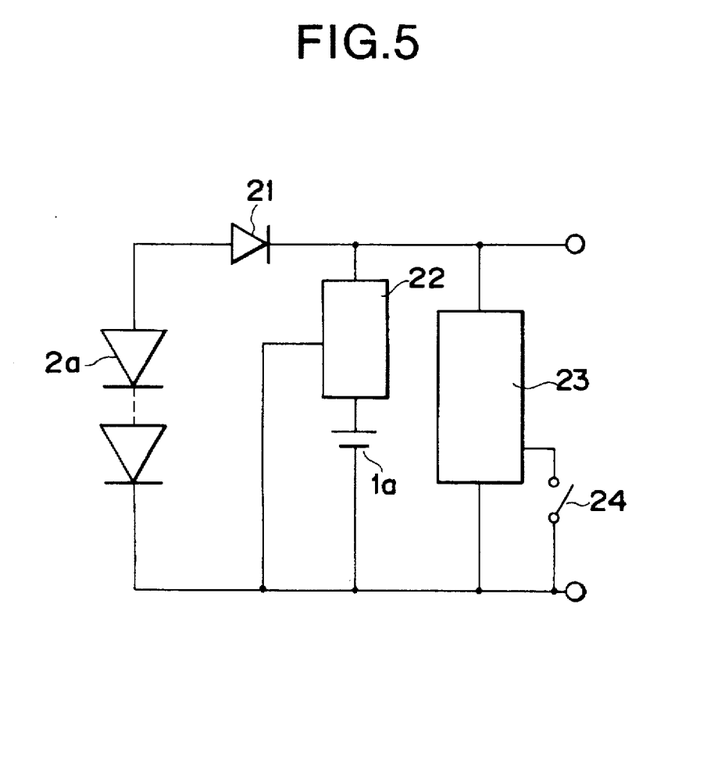
FIG. 5 is a circuit diagram showing the electrical arrangement of the power supply unit of the camera in FIGS. 1A to 1C.

FIGS. 1A to 1C are side views in which the camera is viewed from the side of a surface away from a surface on which a release button is provided. More specifically, FIG. 1A shows a portable state; FIG. 1B shows a standby state in which a lens barrel 1b is extended from the collapsed state, FIG. 1B, to a photography enabled position; and FIG. 1C shows a charging state in which the camera is placed in direct sunlight to expose solar cells 2a (to be described later) to intense light. FIG. 2 is a perspective view in which the camera shown in FIGS. 1A to 1C is viewed in a direction in which the surface with the release button is seen. FIGS. 3 and 4 are partially cutaway perspective views showing a safety mechanism for forming the charging state as illustrated in FIG. 1C. FIG. 5 is a circuit diagram showing the electrical arrangement of the power supply unit of the camera in FIGS. 1A to 1C.

The structure of the camera of this embodiment will be described below with reference to FIGS. 1A to 4.

A camera main body 1 has a lens barrel 1b which is extended from the collapsed position to the photography enabled position in the standby state, FIG. 1B, a stopper 1c to be described in detail later, and an aperture unit (not shown, which is a film or some other image recording medium) in the lower portion of each drawing. The camera main body 1 also incorporates a lithium ion secondary battery 1a at a position indicated by the broken lines in FIG. 2.

A front cover 2 is arranged to be pivotal on a rotating shaft 2c fitted in a hole (not shown) of the camera main body 1. The front cover 2 is normally biased counterclockwise by a torsion spring 4 shown in FIG. 4. In the portable state in FIG. 1A, the front cover 2 is held in this state by the action of a first lock claw 6 (to be described later).

Five amorphous solar cells 2a are arranged on the outer surface of the front cover 2, as in FIG. 2. As illustrated in FIG. 5, these solar cells 2a are connected in series with each other. The solar cells 2a generate energy when exposed to the sunlight, and the lithium ion secondary battery 1a is charged with this energy via a diode 21 for preventing a reverse current (see FIG. 5).

The front cover 2 is also provided with a notch 2b for slidably guiding an operation switch 3b (to be described later), a release button 2d, a charge button 2e for establishing the charging state by an external operation, a strap attachment 2f, and a strap 2g attached to the strap attachment 2f. In addition, as illustrated in FIGS. 3 and 4, the front cover 2 includes a shaft 2h for slidably guiding a main switch lever 3 (to be described later) in the inside portion not seen by the user.

With the shaft 2h described above fitted in a groove 3a, the main switch lever 3 is supported slidably in the right-and-left direction in FIG. 4. The main switch lever 3 is normally biased to the left in FIG. 4 by a spring 5 one end of which is hooked on an arm 3c. The main switch lever 3 is locked in this state by a stopper (not shown). The main switch lever 3 is provided with the operation switch 3b to be operated by the user, a tapered projecting portion 3d, and a lock portion (not shown). The tapered projecting portion 3d is used to push an unlocking portion 6c of the first lock claw 6 (to be described later) for locking the front cover 2. The lock portion (not shown) holds the relationship between the camera main body 1 and the front cover 2 in the state illustrated in FIG. 1B.

The first lock claw 6 is pivotally supported with a shaft (not shown), which is provided in the camera main body 1, and fitted in a hole 6a of the claw 6. As in FIGS. 3 and 4, the first lock claw 6 is normally biased clockwise by a spring 7 one end of which is hooked on an arm 6d. In the state shown in FIG. 1B, the first lock claw 6 is locked by a stopper (not shown). The first lock claw 6 has a locking portion 6b which can enter and leave an elongated groove 8b of a locking lever 8 (to be described later). In the portable state illustrated in FIG. 1A, the locking portion 6b enters (fits in) the elongated groove 8b to hold the front cover 2 in this state against the biasing force of the torsion spring 4. When the unlocking portion 6c provided on the side away from the locking portion 6b is pushed by the tapered projecting portion 3d of the main switch lever 3, the first lock claw 6 pivots counterclockwise against the biasing force of the spring 7. Consequently, the locking portion 6b leaves the elongated groove 8b to unlock the front cover 2, thereby setting the front cover 2 in the standby state, FIG. 1B, from the portable state, FIG. 1A.

Note that the entire first lock claw 6 is seen in FIGS. 3 and 4 since these drawings are perspective views of the safety mechanism for forming the charge state. In practice, however, the first lock claw 6 is almost entirely covered with the cover member of the camera main body 1, and so only the locking portion 6b and the unlocking portion 6c can be seen from the outside, as shown in FIG. 1B.

The locking lever 8 is pivotally supported with a shaft (not shown) of the front cover 2 fitted in its hole 8a. As discussed above, the locking portion 6b of the first lock claw 6 can be fitted in the elongated groove 8b. In the states shown in FIGS. 1A, 1B, and 4, a locking claw portion 8c at the end of the locking lever 8 engages with a locking claw portion 9c of a second lock claw 9 (to be described later). Consequently, the locking lever 8 is held integrated with the front cover 2. In addition, in the charge state in FIG. 1C an L-shaped portion of the locking claw portion 8c of the locking lever 8 is in contact with the stopper 1c of the camera main body 1. Therefore, even if a user carelessly pulls up the front cover 2, no force is directly applied on the first lock claw 6. This protects the first lock claw 6 from being broken.

Note that as illustrated in FIG. 1C, the locking lever 8 is slightly curved along the outer shape of the front cover 2. As can be seen from FIGS. 3, 4, and 1C, the hole 8a as the pivot center points in the same direction in any of these states, allowing a smooth pivot with no play.

The second lock claw 9 is pivotally supported with a shaft (not shown) of the front cover 2 fitted in its hole 9a. The second lock claw 9 is normally biased counterclockwise by a spring 10 one end of which is hooked on an arm 9d, but is locked in the state in FIG. 3 by a stopper (not shown). As mentioned earlier, the second lock claw 9 has a locking claw portion 9b. In the portable state as in FIG. 4, the locking claw portion 9b engages with the locking claw portion 8c of the locking lever 8 to thereby lock the locking lever 8. A hook portion 9c for hooking a wire 11 made of a nickel-titanium shape-memory alloy is arranged on the side away from the locking claw portion 9b.

The wire 11 made of a shape-memory alloy is supported by a shaft with a known eccentric structure. The tension of the wire 11 is adjusted within the stroke. The wire 11 is extended along the rear surface of the front cover 2 via an adjustment pulley 12 (see FIGS. 3 and 4). An end portion 11a of the wire 11 is coupled with a shaft (not shown) of the front cover 2 by a well-known means. When intense sunlight is incident on the surfaces of the solar cells 2a of the front cover 2 in this state and the temperature of the front cover 2 exceeds, e.g., 65° C., the wire 11 constructed of a shape-memory alloy contracts by modification to pivot the second lock claw 9 clockwise against the biasing force of the spring 10. Consequently, the locking claw portion 8c of the locking lever 8 is unlocked from the locking claw portion 9b.

The locking claw portion 8c of the locking lever 8 can also be unlocked from the locking claw portion 9b of the second lock claw 9 when a user pushes the charge formation button 2e, FIG. 2. This is so because the urging force of the charge formation button 2e acts as a force for pivoting the second lock claw 9 clockwise.

The circuit configuration of the power supply unit of the camera with the above arrangement will be described below with reference to FIG. 5.

The circuit shown in FIG. 5 includes the solar cells 2a arranged on the front cover 2 and the lithium ion secondary battery 1a incorporated in the camera main body 1. The circuit also includes the diode 21 for preventing a reverse current, a well-known overcharge preventing circuit 22, a microcomputer 23 for controlling the individual circuits in the camera main body 1, and a main switch 24 which is turned on when the front cover 2 is opened.

The operation of the electronic equipment, i.e., the camera with the above arrangement will be described below.

This camera is carried in the state illustrated in FIG. 1A with the strap 2g hung from the shoulder of the user. Even in this state, the lithium ion secondary battery 1a can be charged if the solar cells 2a are exposed to external light.

When the user wishes to take pictures in a place at which he or she has arrived and slides the operation switch 3b of the main switch lever 3 to the right in FIG. 1A, the front cover 2 pivots counterclockwise against the biasing force of the torsion spring 4. That is, when the main switch lever 3 is slid from the state in FIG. 4 to the right in FIG. 1A, the tapered projecting portion 3d pushes the unlocking portion 6c of the first lock claw 6, pivoting the first lock claw 6 counterclockwise against the biasing force of the spring 7. As a result, the locking portion 6b leaves the elongated groove 8b of the locking lever 8 which is held integrally with the front cover 2 (and therefore the front cover 2 is unlocked from the main body 1). Consequently, the front cover 2 pivots counterclockwise against the biasing force of the torsion spring 4 (in effect, the camera main body 1 pivots in the opposite direction by the reaction, since the front cover 2 is held by the user's hand).

When the front cover 2 pivots to the position shown in FIG. 1B as discussed above (in this case the camera main body 1 and the front cover 2 are held in this state by the lock member (not shown) as mentioned earlier), the main switch 24, FIG. 5, is turned on to extend the lens barrel 1b. Consequently, the camera is set in the photography enabled (standby) state.

Thereafter, the user can take pictures in the same fashion as when using an ordinary camera, by determining the composition through a viewfinder (not shown) and pressing the release button 2d.

Return from the standby state discussed above to the portable state will be described below.

When the operation switch 3b of the main switch lever 3 is slid upward in FIG. 1B from the state shown in FIG. 1B, the front cover 2 and the camera main body 1 are released from the locked state by the lock member (not shown). When the camera main body 1 is pivoted counterclockwise against the biasing force of the torsion spring 4, the locking portion 6b of the first lock claw 6 comes in contact with the lower surface of the locking lever 8 and climbs over the lower surface (this climbing action is smooth since the upper portion of the locking portion 6b is tapered as illustrated in FIG. 1B and the lower surface of the locking lever 8 is chamfered (not shown)). Consequently, as in FIG. 4, the first lock claw 6 engages with the locking lever 8 to set the portable state again. Since the main switch 24 is OFF in this state, the camera does not operate even if the release button 2d is depressed by accident.

An operation performed when the user charges the batteries of the camera in direct sunlight will be described below.

When the user presses the charge button 2e in the portable state in FIGS. 1A, 2, and 4, the second lock claw 9 pivots clockwise against the biasing force of the spring 10, and the locking claw portion 9b is disengaged from the locking claw portion 8c of the locking lever 8. Consequently, the front cover 2 pivots counterclockwise against the biasing force of the torsion spring 4 extended between the front cover 2 and the camera main body 1. In this case, since the locking portion 6b of the first lock claw 6 is kept engaged with the elongated groove 8b of the locking lever 8, the locking lever 8 pivots about the hole 8a as the front cover 2 pivots counterclockwise.

When the locking portion 8c of the locking lever 8 comes in contact with the stopper 1c of the camera main body 1, the pivot of the locking lever 8 and the pivot of the front cover 2 stop. The result is the state shown in FIGS. 3 and 1C.

If the camera is left in this state in, e.g., a parked car during the daytime on a midsummer day, the temperature of the solar cells 2a of the front cover 2 rises to as high as nearly 90° C. However, a thick air layer A as illustrated in FIG. 1C is formed between the camera main body 1 and the front cover 2. For this reason, the temperature of the camera main body 1 does not reach even 60° C. as if the camera main body 1 were hidden under a parasol.

Consequently, the temperature of the lithium ion secondary battery 1a or a film (not shown) arranged in the lower portion of the camera main body 1 is as low as 50° C. (equivalent to the air temperature in a car). This indicates that there is essentially almost no damage to the secondary battery 1a or film even if the camera is left under the above condition for a long time period (long enough to charge the battery).

When the user pushes the front cover 2 downward from this state against the biasing force of the torsion spring 4, the state shown in FIGS. 1A, 2, and 4 is restored.

Consider a case in which the user has left the camera on the dashboard or the like of a car under the above condition by mistake, i.e., a case in which the camera held in the portable state, FIGS. 1A, 2, and 4, is exposed to high-temperature outside air and high-illuminance direct sunlight.

To clarify the effect of the safety function (to be described later) according to this embodiment which acts in these instances as above, a case in which the safety function of this embodiment is not included will be described first. According to the experiments conducted by the present inventors, in an area (e.g., Malaysia) near the equator the internal temperature of a parked car in good weather reaches about 90° C. on the surface of a dashboard, and 85° C. on a seat exposed to direct sunlight. However, the temperature of air convecting in the car is at most about 52° C. on average. The temperature condition reaches such an equilibrium in about one to two hours after the car is placed in direct sunlight.

When the camera in the state shown in FIG. 4 is placed in such an environment, the temperature of the solar cells 2a of the front cover 2 exceeds 90° C. in about one hour. Also, the temperature of a thin air layer between the front cover 2 and the camera main body 1 and the temperature of the front surface of the camera main body 1 reach almost 85° C., a very high value (the reason is that because only about a few millimeters can be assured as the width of the air layer when the portable state of the camera is taken into account, the velocity of the convection between the outside air and the air layer is at most about a few millimeters/sec due to the viscous drag between the rear surface of the front cover 2 and the front surface of the camera main body 1, and this results in a small effect of cooling the rear surface of the front cover 2). This not only damages the individual parts in the camera main body 1 but also damages the lithium ion secondary battery 1a discussed above or a film (or some other image recording medium), since the temperature of the lithium secondary battery 1a exceeds 65° C. and the temperature of the film exceeds 60° C.

The effect of the safety function of this embodiment will be described below.

When the camera in the state shown in FIG. 4 is exposed to the above-mentioned severe environment, the temperature of the front cover 2 becomes 65° C. or higher in about 20 minutes as discussed above. Consequently, the wire 11 made of a shape-memory alloy contracts by modification to pivot the second lock claw 9 clockwise.

As when the charge formation button 2e is pushed, therefore, the locking claw portion 9b of the second lock claw 9 is unlocked from the locking claw portion 8c of the locking lever 8. As a result, the front cover 2 is pivoted (popped up) counterclockwise by the biasing force of the torsion spring 4 as the locking lever 8 pivots counterclockwise about the hole 8a as described above. Consequently, the front cover 2 is set in the charge state shown in FIGS. 1C and 3.

In this state, the air layer (whose width has been a few millimeters) between the front cover 2 and the camera main body 1 is widened to have a width of about ten millimeters to several tens of millimeters, resulting in the convection with the outside air (at a maximum of 52° C.) discussed above. This convection cools the front cover 2 and the front surface of the camera main body 1. In particular, the temperature of the front surface of the camera main body 1 decreases to a value almost equivalent to the value of the air temperature inside the car, since this portion is hidden in the shade of the front cover 2 which is popped up.

The front cover 2 further increases its temperature by absorbing the energy of the sunlight. Since, however, the rear surface of the front cover 2 is cooled by the outside air, the temperature does not exceed 90° C. as discussed above.

Also, in this embodiment the front cover 2 has side walls which entirely cover the side walls of the camera main body 1. Therefore, even if the angle at which the sunlight is incident on the camera in the state as in FIG. 3 has changed (or begins to change), almost no direct sunlight strikes the camera main body 1. Consequently, the temperature of the front surface of the camera main body 1 never rises to be extremely higher than the air temperature.

In addition, in the camera main body 1 the lithium ion secondary battery 1a which is vulnerable to high temperatures is arranged near an opening/closing hinge (the rotating shaft 2c) of the front cover 2. Therefore, in the state shown in FIG. 3 no solar rays at any angle effectively illuminate a portion in the vicinity of the camera main body 1 in which the lithium ion secondary battery 1a is incorporated. This prevents a rise in the temperature of the secondary battery 1a arranged in the lower portion of the camera main body 1.

Furthermore, in the vicinity of the hinge (the rotating shaft 2c) between the front cover 2 and the camera main body 1, the gap between the front cover 2 and the camera main body 1 is small, so it may appear that the heat-insulating effect is small in that portion. However, since the rear surface of the front cover 2 is inclined, air at a high temperature flows upward along this inclined surface. The result is almost no increase on a practical level in the temperature of the front surface of the secondary battery 1a in the camera main body 1.

Moreover, film is also present on the rear surface side of the camera main body 1. Therefore, the temperature of the film rises only to a practically harmless value (about 45° C. in the experiment), bringing about no practical problem.

When the camera is taken out of the car, by the user who has realized that the camera has been left in the above environment for a few days, the outside air (at 40° C. or lower in most cases) flows into the portion between the front cover 2 and the camera main body 1 in which a large gap (the air layer A) is formed in the charge state discussed above. This air flow rapidly cools the wire 11 made of a shape-memory alloy. This shape-memory alloy wire 11 is so designed as to extend again to restore its original state from the modified state discussed above when the temperature decreases below 55° C., so that the tensile force becomes about ⅕, which is smaller than the biasing force of the spring 10. Consequently, the second lock claw 9 pivots counterclockwise to return to the state shown in FIG. 4. When the user pushes the front cover 2 down in this state, the locking claw portion 9b of the second lock claw 9 is engaged with the locking claw portion 8b of the locking lever 8; i.e., these parts are again set in the state shown in FIG. 4. In this portable state the camera is easy to carry and compact.

FIGS. 6A to 7C are views showing an electronic equipment with a solar cell according to the second embodiment of the present invention. In this embodiment, the safety mechanism of the first embodiment is incorporated in a portable telephone.

Figure 6A:
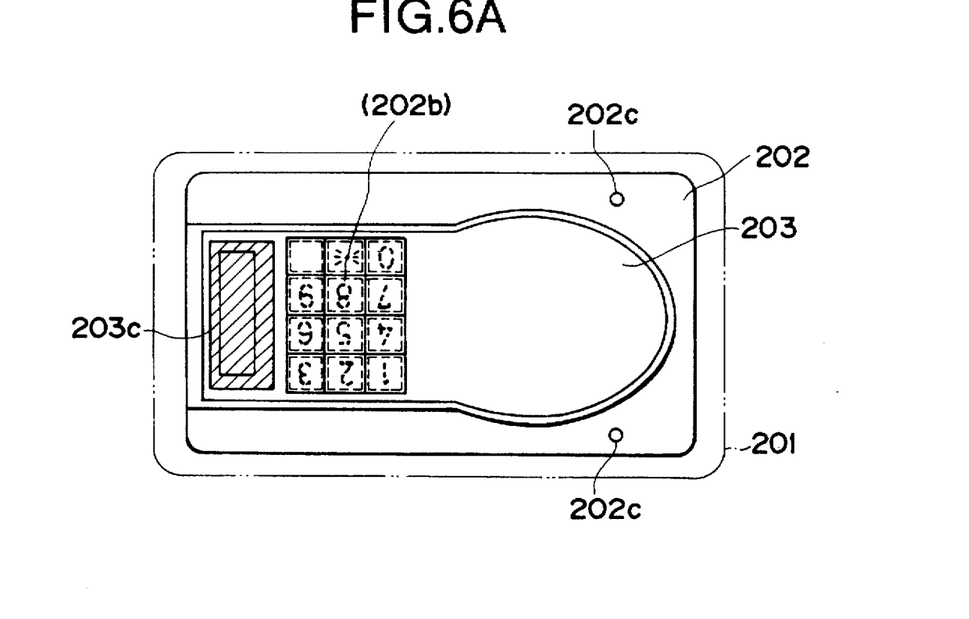
FIGS. 6A and 6B are top views of a portable telephone with its cover removed and closed, respectively, according to the second embodiment of the present invention.
Figure 6B:
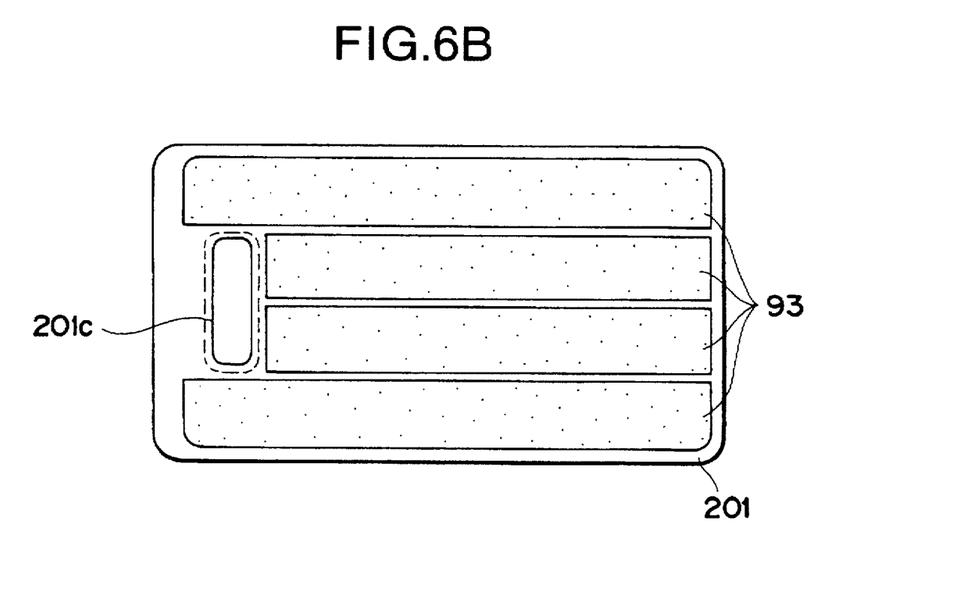
Figure 7A:
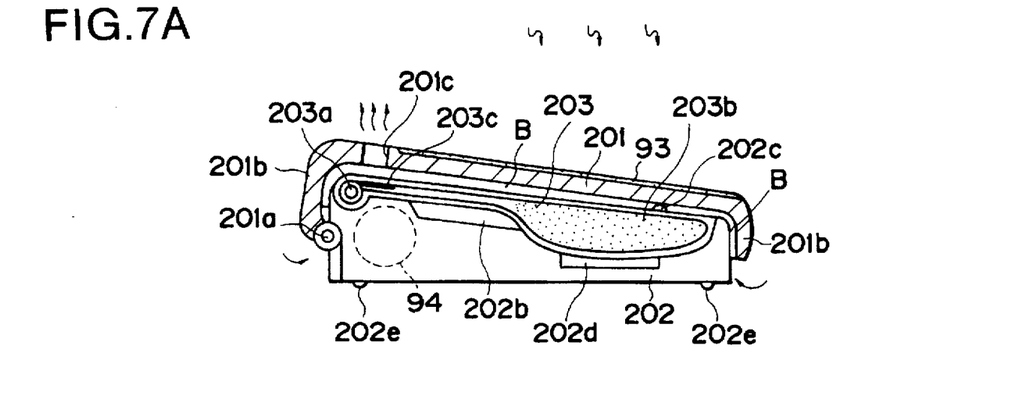
FIGS. 7A to 7C are side views of the portable telephone in FIGS. 6A and 6B.
Figure 7B:
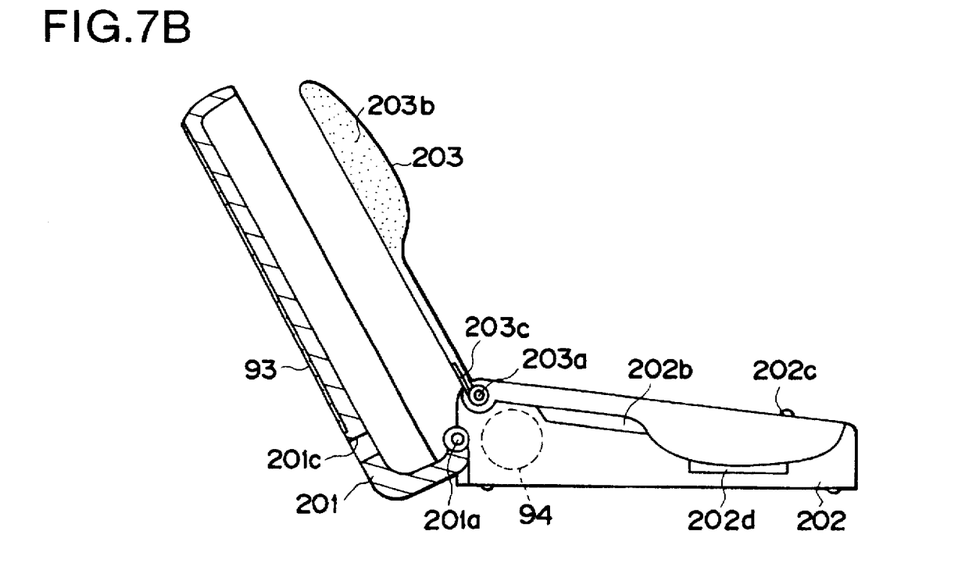
Figure 7C:
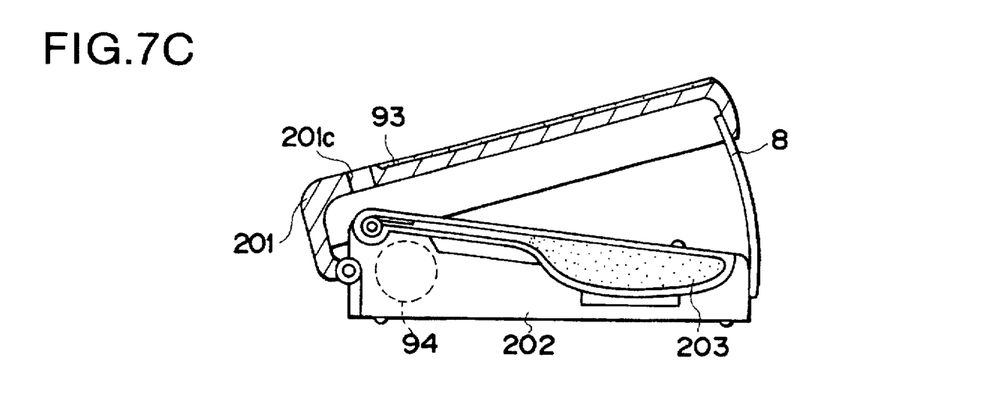

FIG. 6A is a top view showing the state in which a cover is removed from the main body, and FIG. 6B is a top view showing the state in which the cover is closed. FIGS. 7A, 7B, and 7C are side views showing a cover closed state, a cover open state, and a charging state, respectively.

Note that the safety function of this embodiment is identical with that of the first embodiment and therefore omitted from these drawings.

A box-like cover 201 can be pivoted on a hinge shaft 201a and is supported by a main body 202, i.e., a portable telephone as an electronic equipment. As shown in FIG. 6B, solar cells 93 are arranged on the outer surface of this cover 201. These solar cells 93 are connected in series with each other in the cover 201 and connected to a lithium ion secondary battery 94 arranged in the main body 202 via the hinge shaft 201a, as a lead, and a diode (not shown) for preventing a reverse current.

Projections 202c are formed in the main body 202 to form an air layer B (see FIG. 7A) between the cover 201 and the main body 202. Note that the air layer B is also formed between each side wall 201b of the cover 201 and the main body 202. As illustrated in FIG. 7A, a vent hole 201c is formed in the main body 202. When the temperature of the cover 201 rises as the secondary battery 94 is charged with energy generated by the solar cells 93 exposed to direct sunlight, the temperature of the air layer B on the rear side of the cover 201 also rises. Consequently, convection of air occurs as indicated by the arrows in FIG. 7A. That is, the outside air flows in through the gaps formed between the side walls 201b and the main body 202 and flows out of the vent hole 201c. This air flow keeps the temperature of the air layer B on the rear surface side of the cover 201 at substantially the same temperature as the ambient air.

Consequently, the temperature rise of the main body 202 can be suppressed to be nearly equivalent to the temperature of the ambient air.

The main body 202 is also provided with a microphone 202d connected to a circuit (not shown) and push buttons 202b as indicated by the dotted lines in FIG. 6A.

A speaker unit 203 is supported by a hinge shaft 203a so as to be pivotal with respect to the main body 202. A speaker 203b incorporating a sound-generating member is arranged in the distal end portion of the speaker unit 203. A reflecting portion (plated portion) 203c is provided at a position at which it opposes the vent hole 201c in the state shown in FIGS. 6B and 7A. The reflecting portion 203c has a function of regularly reflecting direct sunlight, which enters substantially parallel to the vent hole 201c, from the outside of the cover 201, thereby preventing easy conduction of heat to the speaker 203b. For this purpose, the reflecting portion 203c is so formed that its surface is substantially perpendicular to the vent hole 201c.

The reflecting portion 203c is formed in an electric circuit portion of the speaker unit 203, i.e., in a portion requiring a high heat resistance. In addition, the reflecting portion 203c is connected to the main body 202, which has complicated functional parts and the lithium ion secondary battery 94, only via the hinge shaft 203a. Therefore, even if the temperature of the reflecting portion 203c rises somewhat, the influence of the temperature rise on the main body 202 or on the secondary battery 94 is insignificant.

The temperature rise inside the main body 202 can be decreased by molding the cover 201, the outside members of the main body 202, the hinge shafts 201a and 203a, and the speaker unit 203 by using a synthetic resin with a low thermal conductivity, such as plastics. Also, a plurality of projections 202e formed on the bottom surface of the main body 202 have an effect of preventing heat from readily transferring to the main body 202 even if the temperature of the place (e.g., the dashboard of a car) on which the telephone is left is high.

In the portable telephone of this embodiment, as in the first embodiment, if the temperature of the air between the cover 201 and the main body 202 or between the cover 201 and the speaker unit 203 rises to exceed a certain value, the safety mechanism operates to set the charging state (more specifically, a wire not shown) extended inside the cover 201 and made of a shape-memory alloy acts to pivot a locking lever 8 as shown in FIG. 7C). This further enhances the effect of the air layer, keeping the main body 202 or the speaker unit 203 at a low temperature.

Figure 8:
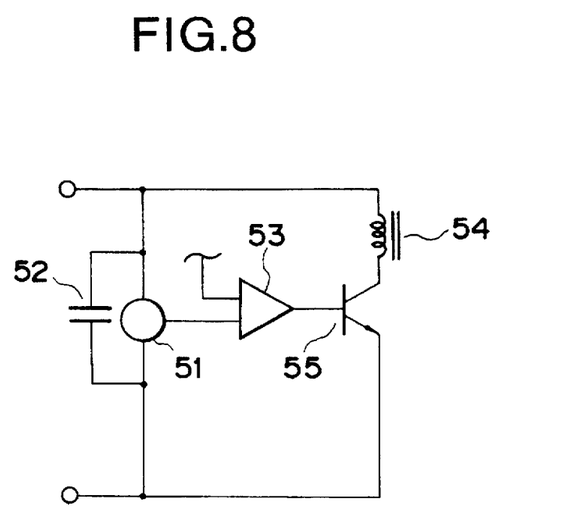
FIG. 8 is a circuit diagram showing an electrical arrangement according to the third embodiment of the present invention.

FIG. 8 is a circuit diagram according to the third embodiment of the present invention. In this embodiment, a temperature sensor and a magnet are used in place of the wire 11 made of a shape-memory alloy, which is used as the constituent element in the safety function in the first embodiment discussed above.

The circuit illustrated in FIG. 8 includes a temperature sensor 51, a capacitor 52, a comparator 53, a magnet 54, and a transistor 55. When the output from the temperature sensor 51 exceeds a reference level, the comparator 53 outputs a high-level signal to turn on the transistor 55. The magnet 54 is driven by the ON transistor 55. When the magnet 54 is driven, its armature attracts the second lock claw 9 in the first embodiment. Consequently, the second lock claw 9 is unlocked from the locking lever 8.

The safety function described above also operates with this arrangement.

That is, when the temperature sensor 51 senses a temperature equal to or higher than a certain predetermined value, the output from the output terminal of the temperature sensor 51 also exceeds a predetermined value. Consequently, the output from the comparator 53 is inverted to high level, and this high-level output is applied to the base of the transistor 55, turning on the transistor 55. The magnet 54 is driven by the ON transistor 55, and the armature of the magnet 54 attracts the second lock claw 9 as discussed above. As a result, the second lock claw 9 is unlocked from the locking lever 8, and consequently the front cover 2 is popped up and set in the charge state. This makes it possible to prevent a temperature rise.

The following effects are accomplished by each of the above embodiments.

1) Solar cells are arranged on a pivotal cover which covers the main body of an equipment, and this cover is spaced apart from the equipment main body when the equipment is placed in a high illuminance. Therefore, even under severe conditions with a high temperature and a high illuminance, a lithium ion secondary battery can be charged with the energy of sunlight without causing any damage to the equipment main body or the secondary battery. Thus the equipment is easy to use.

2) The pop-up mechanism discussed above can be automatically operated in accordance with detection of a temperature rise. Therefore, even if the electronic equipment is inadvertently left under severe conditions at a high temperature and a high illuminance, a similar effect can be obtained.

3) The reliability is improved since the temperature sensor is arranged in a portion right behind the cover (the temperature sensor can also be arranged in a portion most sensitive to a temperature rise, e.g., in the vicinity of the solar cells).

4) Since the temperature rise detecting member is a wire constructed of a shape-memory alloy, temperature detection can be performed with the wire in tight contact with a wide area of the front cover. In addition, the thermal conductivity of the alloy is 100 to 1,000 times as high as that of the surrounding plastic frame. Therefore, even if a variation in the temperature occurs in the front cover due to an uneven irradiation of sunlight, the wire acts in correspondence with the highest temperature. Therefore, the safety mechanism is highly reliable.

5) If the shape-memory alloy described above is used in the form of a spring, rather than a wire, the resultant component is very expensive because of the cost of processing such as forming. However, an order-of-magnitude reduction in the cost can be achieved by the use of the material in the form of a wire. This realizes a safety mechanism with a high cost performance.

6) In regular operations such turning on the main switch and opening/closing the cover or the barrier, the heat-insulating safety mechanism is not seen by the user. That is, a member (the locking lever 8) for holding the cover appears only in the pop-up action. This gives the safety mechanism a smart feeling, resulting in no degradation in the value of the product.

7) The torsion spring for the pop-up operation is also used as the spring for opening/closing the cover, and the locking lever is also used as the locking member (in the embodiments, the locking member for the front cover and the camera main body) for use in normal operations. Consequently, an inexpensive, compact mechanism can be provided.

Note that in the above embodiments, the positions of the parts constituting the heat-insulating safety mechanism can be switched between the equipment main body and the cover.

Note also that in the above embodiments, a temperature rise in the equipment is detected as the temperature itself. However, a temperature rise can also be detected by using, e.g., the illuminance. That is, the present invention can be applied to any arrangement provided that a temperature rise in the equipment can be detected under circumstances in which solar cells generate electricity.

In addition, the method of opening the cover of the equipment is not limited to the one in the above embodiments. Furthermore, the cover need not be opened; i.e., it is only necessary to increase the distance between the equipment and the cover. Also, as the heat-insulating mechanism it is possible to operate a cooling means such as a fan in the equipment.

Moreover, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Also, the individual components shown in schematic or block form in the drawings are all well-known in the camera arts and their specific construction and operation are not critical to the operation or best mode for carrying out the invention.

In the present invention, it is possible to combine the above embodiments or combine the technical elements of the embodiments where necessary.

In the present invention, each arrangement in the claims or in the embodiments can entirely or partly form a single equipment, can combine with another equipment, or can be used as an element constituting an equipment.

The present invention is not limited to the electronic equipment described in the embodiments. That is, the present invention is widely applicable to equipment particularly compact equipment adapted to use solar cells, or devices adapted to such equipment.

What is claimed is:

1. An apparatus adapted to mount thereon a solar cell, comprising:
   (A) a first device which sets said apparatus in a first configuration for use, and in a second not-in-use configuration; and
   (B) a second device which sets said apparatus in a third not-in-use configuration between said first and second configurations for reducing the influence of an increase of temperature on said apparatus.

2. An apparatus according to claim 1, wherein said apparatus comprises an electronic apparatus.

3. An apparatus according to claim 1, wherein said apparatus comprises a portable apparatus.

4. An apparatus according to claim 1, wherein said apparatus comprises a camera.

5. An apparatus according to claim 1, wherein said apparatus comprises a telephone.

6. An apparatus according to claim 1, wherein said second device comprises means for opening a cover of said apparatus.

7. An apparatus according to claim 1, further comprising a cover of said apparatus,
   wherein said second device comprises means for opening said cover of said apparatus.

8. An apparatus according to claim 7, wherein the solar cell is arranged in said cover of said apparatus.

9. An apparatus according to claim 8, further comprising pivoting means for opening said cover of said apparatus by pivoting said cover around one end of said apparatus.

10. An apparatus according to claim 9, further comprising a housing portion for housing a lithium ion battery to be charged by the solar cell, said housing portion being arranged near said pivoting means.

11. An apparatus according to claim 7, further comprising pivoting means for opening said cover of said apparatus by pivoting said cover around one end of said apparatus.

12. An apparatus according to claim 11, further comprising a housing portion for housing a lithium ion battery to be charged by the solar cell, said housing portion being arranged near said pivoting means.

13. An apparatus according to claim 1, further comprising a housing portion for housing a lithium ion battery to be charged by the solar cell.

14. An apparatus according to claim 1, wherein, when a solar cell is mounted in the apparatus, said second device comprises means for determining that the solar cell generates electricity.

15. An apparatus according to claim 1, wherein, when a solar cell is mounted in the apparatus, said second device comprises means for automatically setting said apparatus in the third configuration upon determining that the solar cell generates electricity.

16. An apparatus according to claim 1, wherein, when a solar cell is mounted in the apparatus, said second device comprises a shape-memory alloy for determining that the solar cell generates electricity.

17. An apparatus according to claim 1, wherein, when a solar cell is mounted in the apparatus, said second device comprises a shape-memory alloy for automatically setting said apparatus in the third configuration upon determining that the solar cell generates electricity.

18. An apparatus according to claim 1, wherein, when a solar cell is mounted in the apparatus, said second device comprises a wire-like shape-memory alloy for determining that the solar cell generates electricity.

19. An apparatus according to claim 1, wherein, when a solar cell is mounted in the apparatus, said second device comprises a wire-like shape-memory alloy for automatically setting said apparatus in the third configuration upon determining that the solar cell generates electricity.

20. An apparatus according to claim 1, further comprising a cover of said apparatus,
    wherein, when a solar cell is mounted in the apparatus, said second device comprises a shape-memory alloy for determining that the solar cell generates electricity, said shape-memory alloy being extended along at least one of said apparatus and said cover.

21. An apparatus according to claim 1, wherein, when a solar cell is mounted in the apparatus, said second device comprises means for determining that the solar cell generates electricity, in accordance with a temperature.

22. An apparatus according to claim 1, wherein, when a solar cell is mounted in the apparatus, said second device comprises means for automatically setting said apparatus in the third configuration upon determining that the solar cell generates electricity, in accordance with a temperature.

23. An apparatus according to claim 1, wherein said second device comprises means for increasing a distance between said apparatus and a cover of said apparatus.

24. An apparatus according to claim 23, wherein the solar cell is arranged in said cover of said apparatus.

25. An apparatus according to claim 1, wherein said second device comprises means for increasing a distance between said apparatus and the solar cell.

26. An apparatus according to claim 1, further comprising an elastic member for opening a cover of said apparatus, said elastic member operating in response to an operation of said first and second devices.

27. An apparatus adapted to mount thereon a solar cell, comprising:
    a setting device which automatically sets said apparatus in a configuration for reducing the influence of an increase of temperature on said apparatus by extending a space within an enclosure of said apparatus in accordance with the increase of temperature of said apparatus.

28. An apparatus according to claim 27, wherein said apparatus comprises an electronic apparatus.

29. An apparatus according to claim 27, wherein said apparatus comprises a portable apparatus.

30. An apparatus according to claim 27, wherein said apparatus comprises a camera.

31. An apparatus according to claim 27, wherein said apparatus comprises a telephone.

32. An apparatus according to claim 27, wherein said setting device comprises means for opening a cover of said apparatus.

33. An apparatus according to claim 27, further comprising a cover of said apparatus,
wherein said setting device comprises means for opening said cover of said apparatus.

34. An apparatus according to claim 33, wherein the solar cell is arranged in said cover of said apparatus.

35. An apparatus according to claim 34, further comprising pivoting means for opening said cover of said apparatus by pivoting said cover around one end of said apparatus.

36. An apparatus according to claim 35, further comprising a housing portion for housing a lithium ion battery to be charged by the solar cell, said housing portion being arranged near said pivoting means.

37. An apparatus according to claim 33, further comprising pivoting means for opening said cover of said apparatus by pivoting said cover around one end of said apparatus.

38. An apparatus according to claim 37, further comprising a housing portion for housing a lithium ion battery to be charged by the solar cell, said housing portion being arranged near said pivoting means.

39. An apparatus according to claim 27, further comprising a housing portion for housing a lithium ion battery to be charged by a solar cell when the solar cell is mounted in the apparatus.

40. An apparatus according to claim 27, wherein said setting device comprises means for increasing a distance between said apparatus and a cover of said apparatus.

41. An apparatus according to claim 40, wherein the solar cell is arranged in said cover of said apparatus.

42. An apparatus according to claim 27, wherein, when a solar cell is mounted in the apparatus, said setting device comprises means for increasing a distance between said apparatus and the solar cell.

43. An apparatus according to claim 27, wherein said setting device comprises a shape-memory alloy.

44. An apparatus according to claim 27, wherein said setting device comprises a wire-like shape-memory alloy.

45. A unit of an apparatus which is adapted to mount thereon a solar cell, comprising:
(A) a first device which sets said apparatus in a first configuration for use and in a second not-in-use configuration; and
(B) a second device which sets said apparatus in a third not-in-use configuration between the first and second configurations for reducing the influence of an increase of temperature on said apparatus.

46. A unit according to claim 45, wherein said apparatus comprises an electronic apparatus.

47. A unit according to claim 45, wherein said apparatus comprises a portable apparatus.

48. A unit according to claim 45, wherein said apparatus comprises a camera.

49. A unit according to claim 45, wherein said apparatus comprises a telephone.

50. A unit according to claim 45, wherein said second device comprises means for opening a cover of said apparatus.

51. A unit according to claim 45, further comprising a cover of said apparatus,
wherein said second device comprises means for opening said cover of said apparatus.

52. A unit according to claim 51, wherein the solar cell is arranged in said cover of said apparatus.

53. A unit according to claim 52, further comprising pivoting means for opening said cover of said apparatus by pivoting said cover around one end of said apparatus.

54. A unit according to claim 53, further comprising a housing portion for housing a lithium ion battery to be charged by the solar cell, said housing portion being arranged near said pivoting means.

55. A unit according to claim 51, further comprising pivoting means for opening said cover of said apparatus by pivoting said cover around one end of said apparatus.

56. A unit according to claim 55, further comprising a housing portion for housing a lithium ion battery to be charged by the solar cell, said housing portion being arranged near said pivoting means.

57. A unit according to claim 45, further comprising a housing portion for housing a lithium ion battery to be charged by the solar cell.

58. A unit according to claim 45, wherein, when a solar cell is mounted in the apparatus, said second device comprises means for determining that the solar cell generates electricity.

59. A unit according to claim 45, wherein, when a solar cell is mounted in the apparatus, said second device comprises means for automatically setting said apparatus in the third configuration upon determining that the solar cell generates electricity.

60. A unit according to claim 45, wherein, when a solar cell is mounted in the apparatus, said second device comprises a shape-memory alloy for determining that the solar cell generates electricity.

61. A unit according to claim 45, wherein, when a solar cell is mounted in the apparatus, said second device comprises a shape-memory alloy for automatically setting said apparatus in the third configuration upon determining that the solar cell generates electricity.

62. A unit according to claim 45, wherein, when a solar cell is mounted in the apparatus, said second device comprises a wire-like shape-memory alloy for determining that the solar cell generates electricity.

63. A unit according to claim 45, wherein, when a solar cell is mounted in the apparatus, said second device comprises a wire-like shape-memory alloy for automatically setting said apparatus in the third configuration upon determining that the solar cell generates electricity.

64. A unit according to claim 45, further comprising a cover of said apparatus,
wherein, when a solar cell is mounted in the apparatus, said second device comprises a shape-memory alloy for determining that the solar cell generates electricity, said shape-memory alloy being extended along at least one of said apparatus and said cover.

65. A unit according to claim 45, wherein, when a solar cell is mounted in the apparatus, said second device comprises means for determining that the solar cell generates electricity, in accordance with a temperature.

66. A unit according to claim 45, wherein, when a solar cell is mounted in the apparatus, said second device comprises means for automatically setting said apparatus in the third configuration upon determining that the solar cell generates electricity, in accordance with a temperature.

67. A unit according to claim 45, wherein said second device comprises means for increasing a distance between said apparatus and a cover of said apparatus.

68. A unit according to claim 67, wherein the solar cell is arranged in said cover of said apparatus.

69. A unit according to claim 45, wherein said second device comprises means for increasing a distance between said apparatus and the solar cell.

70. A unit according to claim 45, further comprising an elastic member for opening a cover of said apparatus, said elastic member operating in response to an operation of said first and second devices.

71. A unit of an apparatus which is adapted to mount thereon a solar cell, comprising:
a setting device which automatically sets said apparatus in a configuration for reducing the influence of the increase of temperature on said apparatus by extending a space within an enclosure of said apparatus in accordance with the increase of temperature of said apparatus.

72. A unit according to claim 71, wherein said apparatus comprises an electronic apparatus.

73. A unit according to claim 71, wherein said apparatus comprises a portable apparatus.

74. A unit according to claim 71, wherein said apparatus comprises a camera.

75. A unit according to claim 71, wherein said apparatus comprises a telephone.

76. A unit according to claim 71, wherein said setting device comprises means for opening a cover of said apparatus.

77. A unit according to claim 71, further comprising a cover of said apparatus,
wherein said setting device comprises means for opening said cover of said apparatus.

78. A unit according to claim 77, wherein the solar cell is arranged in said cover of said apparatus.

79. A unit according to claim 78, further comprising pivoting means for opening said cover of said apparatus by pivoting said cover around one end of said apparatus.

80. A unit according to claim 79, further comprising a housing portion for housing a lithium ion battery to be charged by the solar cell, said housing portion being arranged near said pivoting means.

81. An apparatus according to claim 77, further comprising pivoting means for opening said cover of said apparatus by pivoting said cover around one end of said apparatus.

82. A unit according to claim 81, further comprising a housing portion for housing a lithium ion battery to be charged by the solar cell, said housing portion being arranged near said pivoting means.

83. A unit according to claim 71, further comprising a housing portion for housing a lithium ion battery to be charged by a solar cell when the solar cell is mounted thereon.

84. A unit according to claim 71, wherein said setting device comprises means for increasing a distance between said apparatus and a cover of said apparatus.

85. A unit according to claim 84, wherein the solar cell is arranged in said cover of said apparatus.

86. A unit according to claim 71, wherein, when the solar cell is mounted thereon, said setting device comprises means for increasing a distance between said apparatus and the solar cell.

87. A unit according to claim 71, wherein said setting device comprises a shape-memory alloy.

88. A unit according to claim 71, wherein said setting device comprises a wire-like shape-memory alloy.

89. An apparatus adapted to mount thereon a solar cell comprising:
a setting device which automatically sets said apparatus in a configuration for reducing the influence of an increase of temperature on said apparatus by opening said apparatus in accordance with the increase of temperature of said apparatus.

90. An apparatus according to claim 89, wherein said apparatus comprises an electronic apparatus.

91. An apparatus according to claim 89, wherein said apparatus comprises a portable apparatus.

92. An apparatus according to claim 89, wherein said apparatus comprises a camera.

93. An apparatus according to claim 89, wherein said apparatus comprises a telephone.

94. An apparatus according to claim 89, wherein said setting device comprises means for opening a cover of said apparatus.

95. An apparatus according to claim 89, further comprising a cover of said apparatus,
wherein said setting device comprises means for opening said cover of said apparatus.

96. An apparatus according to claim 95, wherein the solar cell is arranged in said cover of said apparatus.

97. An apparatus according to claim 96, further comprising pivoting means for opening said cover of said apparatus by pivoting said cover around one end of said apparatus.

98. An apparatus according to claim 97, further comprising a housing portion for housing a lithium ion battery to be charged by the solar cell, said housing portion being arranged near said pivoting means.

99. An apparatus according to claim 95, further comprising pivoting means for opening said cover of said apparatus by pivoting said cover around one end of said apparatus.

100. An apparatus according to claim 99, further comprising a housing portion for housing a lithium ion battery to be charged by the solar cell, said housing portion being arranged near said pivoting means.

101. An apparatus according to claim 89, further comprising a housing portion for housing a lithium ion battery to be charged by a solar cell when the solar cell is mounted in the apparatus.

102. An apparatus according to claim 89, wherein said setting device comprises means for increasing a distance between said apparatus and a cover of said apparatus.

103. An apparatus according to claim 102, wherein the solar cell is arranged in said cover of said apparatus.

104. An apparatus according to claim 89, wherein, when the solar cell is mounted in the apparatus, said setting device comprises means for increasing a distance between said apparatus and the solar cell.

105. An apparatus according to claim 89, wherein said setting device comprises a shape-memory alloy.

106. An apparatus according to claim 89, wherein said setting device comprises a wire-like shape-memory alloy.

107. A unit of an apparatus which is adapted to mount thereon a solar cell, comprising:
a setting device which automatically sets the configuration of said apparatus in a configuration for reducing the influence of an increase of temperature on said apparatus by opening said apparatus in accordance with the increase of temperature.

108. A unit according to claim 107, wherein said apparatus comprises an electronic apparatus.

109. A unit according to claim 107, wherein said apparatus comprises a portable apparatus.

110. A unit according to claim 107, wherein said apparatus comprises a camera.

111. A unit according to claim 107, wherein said apparatus comprises a telephone.

112. A unit according to claim 107, wherein said setting device comprises means for opening a cover of said apparatus.

113. A unit according to claim 107, further comprising a cover of said apparatus, wherein said setting device comprises means for opening said cover of said apparatus.

114. A unit according to claim 113, wherein the solar cell is arranged in said cover of said apparatus.

115. A unit according to claim 114, further comprising pivoting means for opening said cover of said apparatus by pivoting said cover around one end of said apparatus.

116. A unit according to claim 115, further comprising a housing portion for housing a lithium ion battery to be charged by the solar cell, said housing portion being arranged near said pivoting means.

117. An apparatus according to claim 113, further comprising pivoting means for opening said cover of said apparatus by pivoting said cover around one end of said apparatus.

118. A unit according to claim 117, further comprising a housing portion for housing a lithium ion battery to be charged by the solar cell, said housing portion being arranged near said pivoting means.

119. A unit according to claim 107, further comprising a housing portion for housing a lithium ion battery to be charged by a solar cell when the solar cell is mounted thereon.

120. A unit according to claim 107, wherein said setting device comprises means for increasing a distance between said apparatus and a cover of said apparatus.

121. A unit according to claim 120, wherein the solar cell is arranged in said cover of said apparatus.

122. A unit according to claim 107, wherein, when the solar cell is mounted thereon, said setting device comprises means for increasing a distance between said apparatus and the solar cell.

123. A unit according to claim 107, wherein said setting device comprises a shape-memory alloy.

124. A unit according to claim 107, wherein said setting device comprises a wire-like shape-memory alloy.

125. An apparatus adapted to mount thereon a solar cell, comprising:
(A) a first device which sets said apparatus in a first configuration for use, and in a second not-for-use configuration; and
(B) a second device which holds said apparatus in a third not-for-use configuration different from said first and second configurations for reducing the influence of an increase of temperature on said apparatus.

126. An apparatus according to claim 125, wherein said apparatus comprises an electronic apparatus.

127. An apparatus according to claim 125, wherein said apparatus comprises a portable apparatus.

128. An apparatus according to claim 125, wherein said apparatus comprises a camera.

129. An apparatus according to claim 125, wherein said apparatus comprises a telephone.

130. An apparatus according to claim 125, wherein said second device comprises means for opening a cover of said apparatus.

131. An apparatus according to claim 125 further comprising a cover of said apparatus,
wherein said second device comprises means for opening said cover of said apparatus.

132. An apparatus according to claim 131, wherein the solar cell is arranged in said cover of said apparatus.

133. An apparatus according to claim 132, further comprising pivoting means for opening said cover of said apparatus by pivoting said cover around one end of said apparatus.

134. An apparatus according to claim 133, further comprising a housing portion for housing a lithium ion battery to be charged by the solar cell, said housing portion being arranged near said pivoting means.

135. An apparatus according to claim 131, further comprising pivoting means for opening said cover of said apparatus by pivoting said cover around one end of said apparatus.

136. An apparatus according to claim 135, further comprising a housing portion for housing a lithium ion battery to be charged by the solar cell, said housing portion being arranged near said pivoting means.

137. An apparatus according to claim 125, further comprising a housing portion for housing a lithium ion battery to be charged by a solar cell when the solar cell is mounted in the apparatus.

138. An apparatus according to claim 125, wherein, when a solar cell is mounted in the apparatus, said second device comprises means for determining that the solar cell generates electricity.

139. An apparatus according to claim 125, wherein, when a solar cell is mounted in the apparatus, said second device comprises means for automatically setting said apparatus in the third configuration upon determining that the solar cell generates electricity.

140. An apparatus according to claim 125, wherein, when a solar cell is mounted in the apparatus, said second device comprises a shape-memory alloy for determining that the solar cell generates electricity.

141. An apparatus according to claim 125, wherein, when a solar cell is mounted in the apparatus, said second device comprises a shape-memory alloy for automatically setting said apparatus in the third configuration upon determining that the solar cell generates electricity.

142. An apparatus according to claim 125, wherein, when a solar cell is mounted in the apparatus, said second device comprises a wire-like shape-memory alloy for determining that the solar cell generates electricity.

143. An apparatus according to claim 125, wherein, when a solar cell is mounted in the apparatus, said second device comprises a wire-like shape-memory alloy for automatically setting said apparatus in the third configuration upon determining that the solar cell generates electricity.

144. An apparatus according to claim 125, further comprising a cover of said apparatus,
wherein, when a solar cell is mounted in the apparatus, said second device comprises a shape-memory alloy for determining that the solar cell generates electricity, said shape-memory alloy being extended along at least one of said apparatus and said cover.

145. An apparatus according to claim 125, wherein, when a solar cell is mounted in the apparatus, said second device comprises means for determining that the solar cell generates electricity, in accordance with a temperature.

146. An apparatus according to claim 125, wherein, when a solar cell is mounted in the apparatus, said second device comprises means for automatically setting said apparatus in the third configuration upon determining that the solar cell generates electricity, in accordance with a temperature.

147. An apparatus according to claim 125, wherein said second device comprises means for increasing a distance between said apparatus and a cover of said apparatus.

148. An apparatus according to claim 147, wherein the solar cell is arranged in said cover of said apparatus.

149. An apparatus according to claim 125, wherein said second device comprises means for increasing a distance between said apparatus and the solar cell.

150. An apparatus according to claim 125, further comprising an elastic member for opening a cover of said apparatus, said elastic member operating in response to an operation of said first and second devices.

151. A unit of an apparatus which is adapted to mount thereon a solar cell, comprising:
(A) a first device which sets said apparatus in a first configuration for use and in a second not-for-use configuration; and
(B) a second device which holds said apparatus in a third configuration different from the first and second configurations for reducing the influence of an increase of temperature on said apparatus.

152. A unit according to claim 151, wherein said apparatus comprises an electronic apparatus.

153. A unit according to claim 151, wherein said apparatus comprises a portable apparatus.

154. A unit according to claim 151, wherein said apparatus comprises a camera.

155. A unit according to claim 151, wherein said apparatus comprises a telephone.

156. A unit according to claim 151, wherein said second device comprises means for opening a cover of said apparatus.

157. A unit according to claim 151 further comprising a cover of said apparatus,
wherein said second device comprises means for opening said cover of said apparatus.

158. A unit according to claim 157, wherein the solar cell is arranged in said cover of said apparatus.

159. A unit according to claim 158, further comprising pivoting means for opening said cover of said apparatus by pivoting said cover around one end of said apparatus.

160. A unit according to claim 159, further comprising a housing portion for housing a lithium ion battery to be charged by the solar cell, said housing portion being arranged near said pivoting means.

161. A unit according to claim 157, further comprising pivoting means for opening said cover of said apparatus by pivoting said cover around one end of said apparatus.

162. A unit according to claim 161, further comprising a housing portion for housing a lithium ion battery to be charged by the solar cell, said housing portion being arranged near said pivoting means.

163. A unit according to claim 151, further comprising a housing portion for housing a lithium ion battery to be charged by the solar cell when the solar cell is mounted thereon.

164. A unit according to claim 151, wherein, when a solar cell is mounted thereon, said second device comprises means for determining that the solar cell generates electricity.

165. A unit according to claim 151, wherein, when a solar cell is mounted thereon, said second device comprises means for automatically setting said apparatus in the third configuration upon determining that the solar cell generates electricity.

166. A unit according to claim 151, wherein, when a solar cell is mounted thereon, said second device comprises a shape-memory alloy for determining that the solar cell generates electricity.

167. A unit according to claim 151, wherein, when a solar cell is mounted thereon, said second device comprises a shape-memory alloy for automatically setting said apparatus in the third configuration upon determining that the solar cell generates electricity.

168. A unit according to claim 151, wherein, when a solar cell is mounted thereon, said second device comprises a wire-like shape-memory alloy for determining that the solar cell generates electricity.

169. A unit according to claim 151, wherein, when a solar cell is mounted thereon, said second device comprises a wire-like shape-memory alloy for automatically setting said apparatus in the third configuration upon determining that the solar cell generates electricity.

170. A unit according to claim 151, further comprising a cover of said apparatus,
wherein, when a solar cell is mounted thereon, said second device comprises a shape-memory alloy for determining that the solar cell generates electricity, said shape-memory alloy being extended along at least one of said apparatus and said cover.

171. A unit according to claim 151, wherein, when a solar cell is mounted thereon, said second device comprises means for determining that the solar cell generates electricity, in accordance with a temperature.

172. A unit according to claim 151, wherein, when a solar cell is mounted thereon, said second device comprises means for automatically setting said apparatus in the third configuration upon determining that the solar cell generates electricity, in accordance with a temperature.

173. A unit according to claim 151, wherein said second device comprises means for increasing a distance between said apparatus and a cover of said apparatus.

174. A unit according to claim 173, wherein the solar cell is arranged in said cover of said apparatus.

175. A unit according to claim 151, wherein said second device comprises means for increasing a distance between said apparatus and the solar cell when the solar cell is mounted thereon.

176. A unit according to claim 151, further comprising an elastic member for opening a cover of said apparatus, said elastic member operating in response to an operation of said first and second devices.

* * * * *